(12) United States Patent
Nir et al.

(10) Patent No.: US 12,375,635 B2
(45) Date of Patent: Jul. 29, 2025

(54) STEREO CAMERA CALIBRATION USING SCREEN BASED TARGET PROJECTIONS

(71) Applicant: Asensus Surgical US, Inc., Durham, NC (US)

(72) Inventors: Tal Nir, Haifa (IL); Lior Alpert, Haifa (IL)

(73) Assignee: Asensus Surgical Europe S.à.R.L., Bertrange (LU)

( * ) Notice: Subject to any disclaimer, the term of this patent is extended or adjusted under 35 U.S.C. 154(b) by 21 days.

(21) Appl. No.: 18/092,302

(22) Filed: Dec. 31, 2022

(65) Prior Publication Data

US 2023/0217003 A1    Jul. 6, 2023

Related U.S. Application Data

(60) Provisional application No. 63/295,793, filed on Dec. 31, 2021.

(51) Int. Cl.
*H04N 13/246* (2018.01)
*G06T 7/80* (2017.01)

(52) U.S. Cl.
CPC ............. *H04N 13/246* (2018.05); *G06T 7/85* (2017.01)

(58) Field of Classification Search
CPC ...... H04N 13/246; H04N 17/002; G06T 7/85; G06T 2207/10021; G06T 2207/30208
USPC ............................................................ 348/42
See application file for complete search history.

(56) References Cited

U.S. PATENT DOCUMENTS

| | | | |
|---|---|---|---|
| 11,172,193 B1* | 11/2021 | Reddy ................. | H04N 23/633 |
| 2008/0075324 A1* | 3/2008 | Sato ........................ | G06T 7/80 |
| | | | 348/E13.005 |
| 2010/0245541 A1* | 9/2010 | Zhao ..................... | H04N 13/246 |
| | | | 348/E13.001 |
| 2012/0287287 A1* | 11/2012 | Grossmann .......... | H04N 17/002 |
| | | | 348/181 |
| 2015/0103147 A1* | 4/2015 | Ho ............................ | G06T 7/85 |
| | | | 348/47 |
| 2017/0019656 A1* | 1/2017 | Liu ....................... | H04N 13/296 |
| 2019/0132577 A1* | 5/2019 | Rowell ................. | H04N 13/178 |
| 2021/0157112 A1* | 5/2021 | Raab .................... | G02B 21/0012 |

* cited by examiner

*Primary Examiner* — Susan E. Hodges

(57) ABSTRACT

In a system and method of calibrating a stereoscopic camera, a target pattern is electronically displayed on a display. The camera to be calibrated captures images of the target pattern using a stereoscopic camera while the displayed target pattern is altered over time. The captured images are analyzed and calibration parameters for the stereoscopic camera are determined.

6 Claims, 4 Drawing Sheets

STEREO CAMERA CALIBRATION USING SCREEN BASED TARGET PROJECTIONS

This application claims the benefit of U.S. Provisional Application No. 63/295,793, filed Dec. 31, 2021.

BACKGROUND

Computer vision can be a useful tool for gaining an understanding of a surgical environment. For example, it can be used to estimate 3D measurements between features within an operative site, such as the measurements between instruments disposed at the surgical site, or measurements of anatomical features within the body cavity. Co-pending and commonly owned U.S. application Ser. No. 17/035,534, entitled "Method and System for Providing Real Time Surgical Site Measurements" describes a system and method that use image processing of the endoscopic view to determine sizing and measurement information for a hernia defect or other area of interest within a surgical site. Co-pending and commonly owned U.S. application Ser. No. 17/099,761, entitled "Method and System for Providing Surgical Site Measurements" describes a system and method that use image processing of images of the endoscopic view to estimate or determine distance measurements between identified measurement points at the treatment site. The measurements may be straight line point to point measurements, or measurements that follow the 3D topography of the tissue positioned between the measurement points.

Camera calibration is essential for such physical 3D measurements using image data, and for other computer vision features such as image distortion correction, image rectification, etc.

Camera calibration solutions typically involve some unique known patterns (fiducials) presented in front of the camera in different poses. A commonly used technique is similar to that described in Z. Zhang, "*A flexible new technique for camera calibration*," in IEEE Transactions on Pattern Analysis and Machine Intelligence, vol. 22, no. 11, pp. 1330-1334, November 2000 ("Zhang"). This type of calibration works well but depending on the context in which the camera is to be used, it can delay use of the camera, occupy personnel, and make it difficult to perform "on the fly" calibrations. A camera calibration procedure typically involves printing a checkerboard grid on a planar surface, or using some other designed fiducials, and moving the camera in front of the pattern, or vice versa. In the operating room, calibrating a laparoscopic camera before surgery is a time consuming task that adds to the burden of the operating room staff before surgery. Typical practices requires a staff member to move a calibration pattern in front of the camera, both translating and rotating the pattern in front of the camera while the camera captures images and the associated processors perform the calibration. It would be advantageous to calibrate the camera without occupying the operating room staff with this time-consuming calibration task prior to commencing the procedure.

This application describes a system and method of calibrating a camera in a manner that can be conducted with a reduced amount of interaction on the part of the surgical staff.

DETAILED DESCRIPTION

This application describes the use of calibration targets that are displayed in view of the camera to be calibrated. The displayed patterns electronically change so that operating room personnel do not need to move the targets in front of the camera.

Figure 1A:
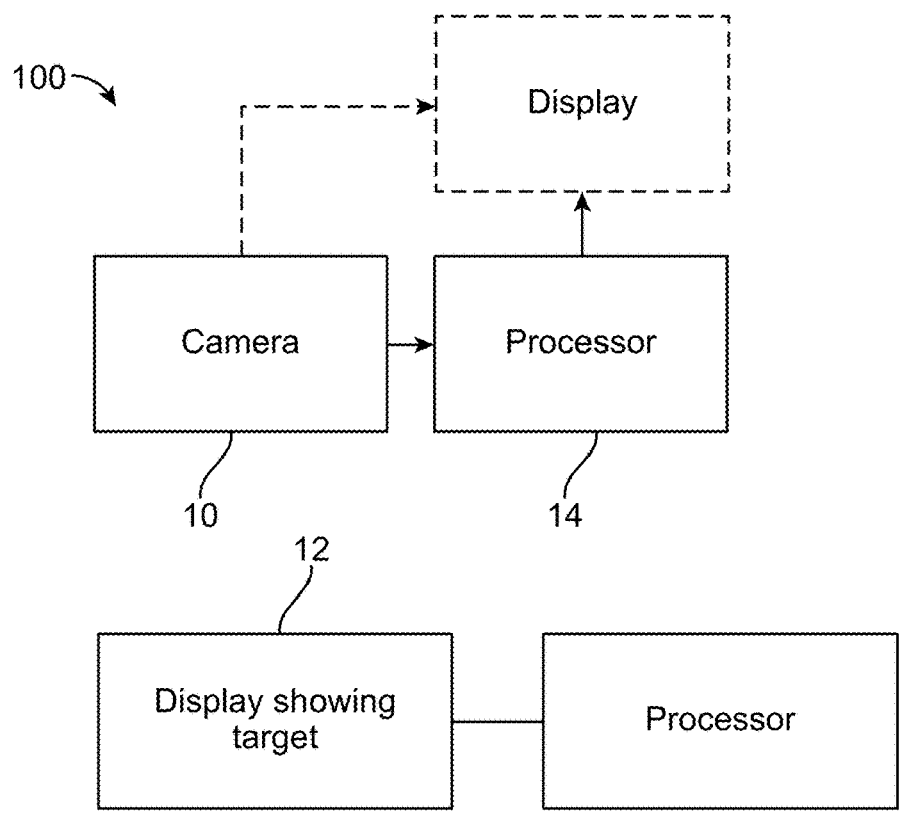
FIG. 1A shows an example of a calibration system in accordance with the disclosed embodiments.
Figure 1B:
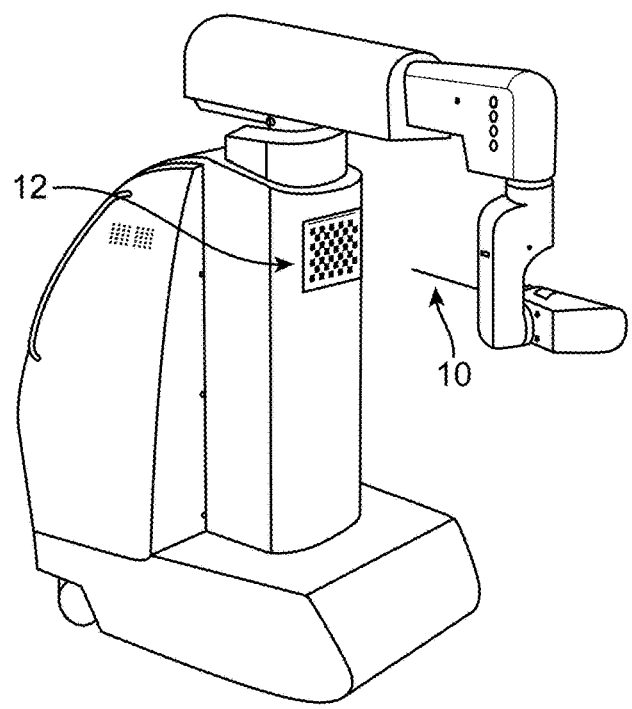
FIG. 1B shows a screen used to display a calibration target mounted to a fixtured on a portion of a robotic manipulator that also supports the camera undergoing calibration.

Referring to FIG. 1A, an embodiment of a calibration system 100 system comprises:

1. A stereo camera 10, which may be a laparoscopic/endoscopic camera used during surgery, stereo or monocular. This camera is the goal of the calibration procedure. The stereo camera 10 is preferably positioned in a stable location such that it does not move during the calibration procedure. Although this invention is not limited to calibration of cameras used in robotic surgery, in the example shown in FIG. 1B, the camera 10 is one used for a robotic surgical system, and it is shown mounted to a surgical manipulator.
2. A target 12 in the form of a display for displaying a graphical target. The display may be a screen of a tablet computer or other image display. It is positioned in view of the camera 10. It is preferably positioned in a stable location, such as by being mounted to a fixture. In the example shown in FIG. 1B, screen displaying the target 12 is positioned on a fixed portion of the robotic manipulator that holds the camera.

The displayed graphical target is a changing sequence of images displayed to be presented on the screen, and the set of corner points located in each image. The software for generating and presenting the pattern images may be on the processor used to captures the image from the camera, or a different one. As one particular example, it may be an application running on a tablet computer that also serves as the target display. Known projection screen properties are used for calculating the planar 3D locations of the points presented on the screen (typically multiplication by a factor calculated from the screen resolution and physical size).

3. At least one processor 14 that receives the image data/video from the camera(s) and samples the images. Algorithms stored in memory of the computing unit(s) are executable to perform various functions, including:
    Analyzing each image captured by each camera for detecting the pattern corner points from the captured images.
    Solving the calibration problem by optimization (e.g., Levenberg-Marquardt) of the unknown parameters, using the known planar 3D locations, and their 2D projections in both camera images.

4. Optionally, a means for changing the relative camera to screen pose for projecting the patterns in more than one location. This can be manual, or motorized if the camera (or screen) is mounted on a robotic arm, e.g., laparoscopic camera held by an arm in a robotic surgical system.

Method

In order to calibrate camera 10 using the disclosed system, a changing series of patterns is projected/displayed on a screen 12 viewed by the stereo camera 10. The projected pattern grid points of the pattern have known 2D locations on the screen, which can be calculated as 3D locations on the planar surface of the screen. As can be seen by comparing the image display of FIG. 2A and that of FIG. 3A, the perspective of the grid pattern changes during the displayed sequence, as of a planar grid pattern is being tilted in various directions to change its planar orientation relative to the plane of the display. The position and rotational orientation of the grid pattern also varies throughout the sequence. See also FIGS. 4A and 4B which show images from another target sequence.

The locations of the points are identified by the at least one processor 14 from the image captured by each of camera sensor within the stereo camera 10, imposing 3D to 2D projection constraints. The screen and stereo camera 10 need not be moved during the projection of a predefined series of images, therefore, the 6DOF of the relative screen to camera pose is fixed throughout the projection process, which reduces the number of unknowns to a fixed number. This is more simple than standard calibration techniques using a standard handheld moving camera (or pattern), where the pose changes in each frame, adding 6 unknowns to each image.

The optimization problem consists of minimizing the mean squared reprojection error. The unknowns to be determined are the parameters of both cameras in the stereo setting, the relative pose of the two cameras, and the relative pose of the screen relative to the stereo cameras. The 3D locations of the pattern points in screen coordinates are known in each frame, and their 2D projections on both cameras. In order to improve the accuracy, the patterns projection process may be performed in more than one relative camera-screen location, in this case, it is beneficial to group all the images projected in the same relative pose, under the same 6DOF screen-camera parameters, and there are several of these, according to the number of relative poses. One relative screen-camera location may be used, but two are more are optimal for ensuring good results for the relative translation parameters between the two stereo cameras. In the configuration shown in FIG. 1B, a change in relative screen-camera location can be achieved by repositioning the manipulator holding the camera, or repositioning the tablet (e.g., moving it to a different fixture on the manipulator, or if the fixture itself has joints or other moveable features, adjusting the position of the fixture).

Figure 2A:
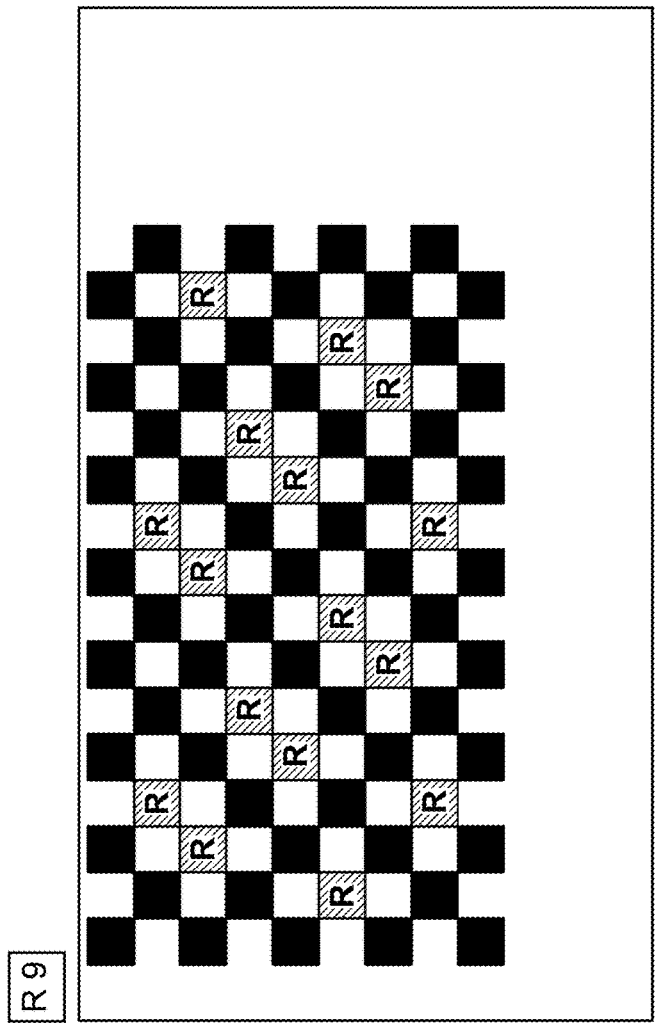
FIG. 2A illustrates one example of a calibration pattern electronically displayed as part of a sequence of patterns. In this illustrated pattern, red, black, and white squares are shown.
Figure 2B:
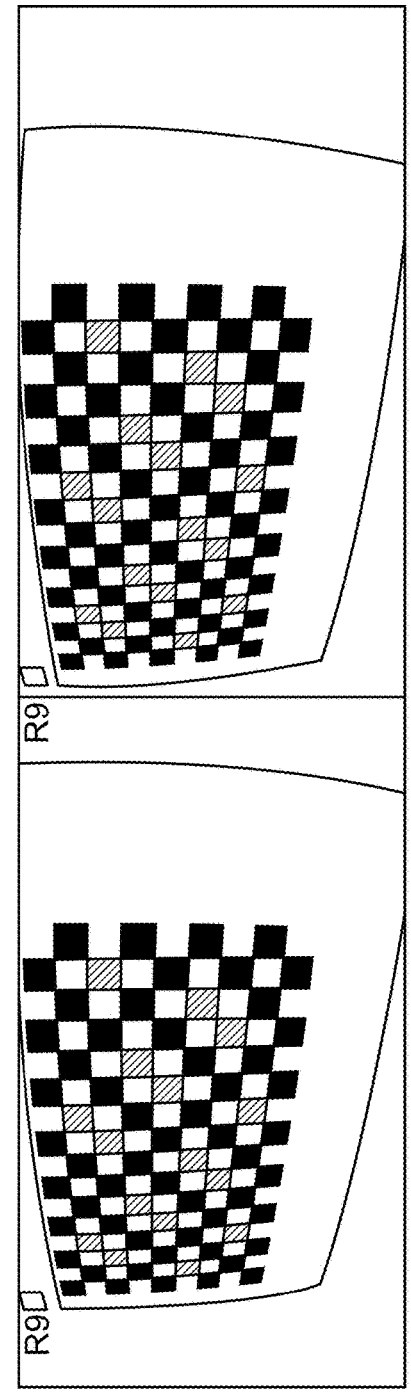
FIG. 2B shows left and right images of the pattern of FIG. 2A as captured from the stereo camera.
Figure 3A:
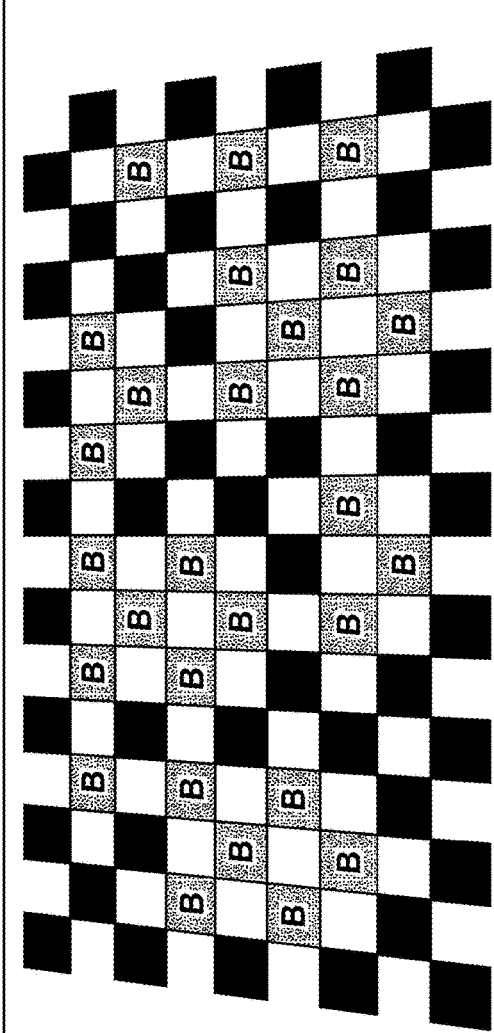
FIG. 3A illustrates a second example of a calibration pattern electronically displayed as part of a sequence of patterns. In this illustrated pattern, blue, black, and white squares are shown.
Figure 3B:
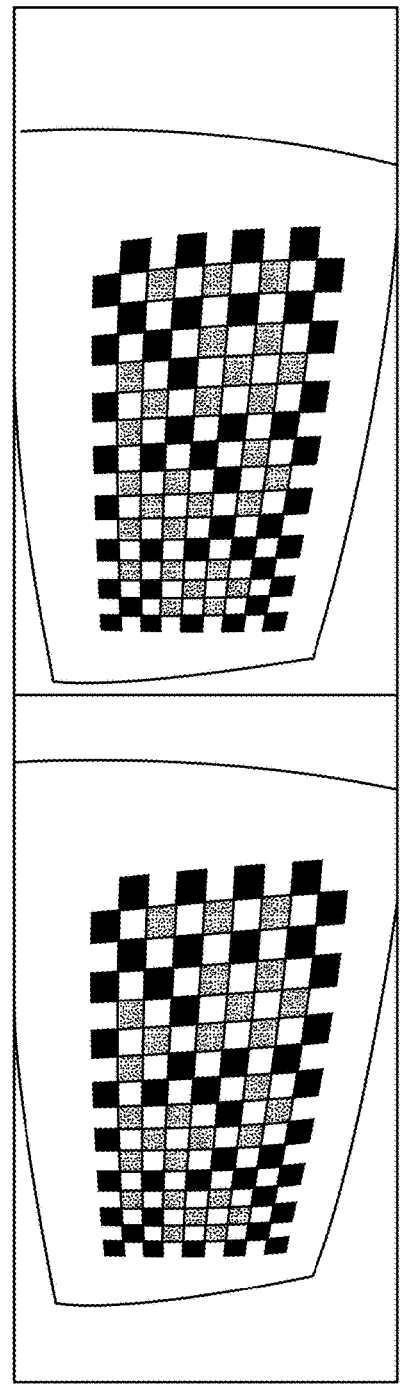
FIG. 3B shows left and right images of the pattern of FIG. 2A as captured from the stereo camera.
Figure 4A:
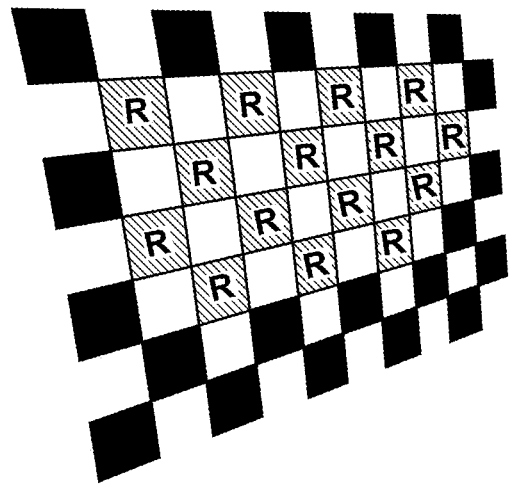
FIGS. 4B and 4B are similar to FIGS. 3A and 3B and show patterns from yet another target sequence.
Figure 4B:
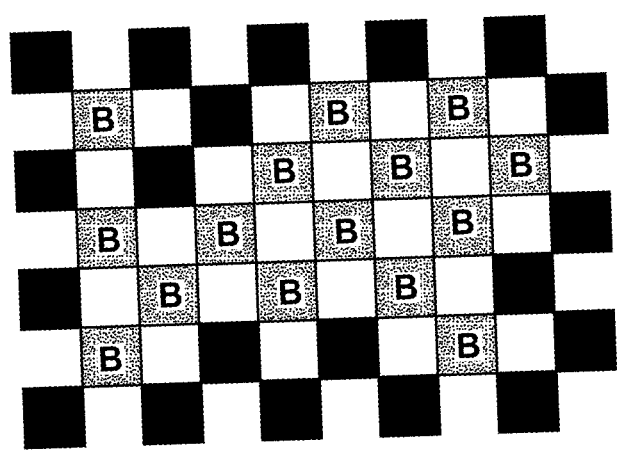

If the patterns are not projected by the same computer capturing the camera images (for example if the screen is a tablet application for cyclic presenting the sequence of patterns, not synched to the computer capturing the images), data must be communicated or know to the processor 14 to allow it to know which pattern is presented at any given moment, in order to expect the proper 2D (and 3D screen, by the screen properties) locations. One method of doing this is to color code the patterns in the displayed in order to encode the number of image projected. This allows the processor 14 to easily detect an image change (red-blue code) from the displayed images. Thus, for an exemplary sequence, FIG. 2A illustrates the pattern shown as the ninth image of the sequence. It includes red color codes (the squares marked "R"). FIG. 3A illustrates the pattern shown as the sixteenth displayed image of the sequence. It includes blue color codes (the squares marked "B"). The color codes in this example are binary encoded in the displayed squares, replacing the black color, the codes are only on the inner squares. The alternating blue-red throughout the displayed sequences is used to help the processor quickly determine that there has been a change in the image. Note that the R's and B's shown in the drawing will not typically be part of the calibration pattern, but they are used to distinguish the black squares from the colored squares in black and white drawings.

The concepts described in this application provide a number of advantages over existing calibration methods. It eliminates the need for a user to wave the pattern in front of the camera, since the pattern change. The patterns are changed automatically, requiring little user involvement. Moreover, since the patterns are projected from a static camera-screen pose, there are more constraints to the problem, and fewer unknowns, facilitating a faster and less complex calibration. In addition, once the target display screen is inside the field of view of the camera, all the patterns projected are in the field of view, whereas in the standard calibration, the pattern can easily be partially outside the field of view, which reduces the number of useful frames.

All patents, applications and articles referred to herein are incorporated by reference.

What is claimed is:

1. A method of calibrating a stereoscopic camera, comprising the steps of:
   displaying a sequence of target patterns on a display, each displayed target pattern differing from the directly preceding displayed target pattern by (i) at least one of position on the display, angular orientation on the display, and perceived planar orientation or perspective, and by (ii) a change in color of at least a portion of the displayed target, wherein the change in color comprises a change from a pattern having black elements and elements of a first color, to a pattern having black elements and elements of a second color, the first color different from the second color;
   capturing images of each displayed target pattern using a stereoscopic camera; and
   for each target pattern in the displayed sequence of target patterns, analyzing the change in color in the target pattern captured in the captured images to identify which target pattern in the displayed sequence of target patterns is being displayed;
   analyzing the captured images to determine calibration parameters for the stereoscopic camera.

2. The method of claim 1, wherein displaying a sequence of target patterns includes altering the position of the pattern on the display.

3. The method of claim 1, wherein displaying a sequence of target patterns includes altering an angular orientation of the pattern on the display.

4. The method of claim 1, wherein displaying a sequence of target patterns includes altering a perceived perspective of the pattern on the display.

5. The method of claim 1, wherein the camera is a stereoscopic endoscopic camera and the method is a method of calibrating the stereoscopic endoscopic camera,
   wherein the method further comprises:
      providing a surgical robotic manipulator arm having the display mounted thereon;

mounting the stereoscopic endoscopic camera to the robotic manipulator arm;

with the stereoscopic endoscopic camera on the surgical robotic manipulator arm, displaying the sequence of target patterns on the display and capturing the images of the target pattern using the stereoscopic endoscopic camera.

6. The method of claim 5, wherein the method includes, orienting the stereoscopic endoscopic camera on the surgical robotic manipulator arm such that the display is within the field of view of the stereoscopic endoscopic camera; and capturing images of features within the body cavity using the stereoscopic endoscopic camera.

\* \* \* \* \*